United States Patent [19]

Kinney et al.

[11] Patent Number: 5,213,203
[45] Date of Patent: May 25, 1993

[54] ENDLESS CONVEYOR SYSTEM

[76] Inventors: D. Brooke Kinney, 355 Prospect Bay Dr., West Grasonville, Md. 21638; Douglas S. Kinney, 719 Carlise Dr., Arnold, Md. 21012

[21] Appl. No.: 899,494

[22] Filed: Jun. 16, 1992

[51] Int. Cl.$^5$ ............................................. B65G 17/06
[52] U.S. Cl. ..................................... 198/850; 198/834
[58] Field of Search ................. 198/832, 834, 850, 853

[56] References Cited

U.S. PATENT DOCUMENTS

| | | | |
|---|---|---|---|
| 485,501 | 11/1892 | Langford | 198/850 X |
| 1,809,054 | 6/1931 | Mattison | 198/853 X |
| 2,188,025 | 1/1940 | Weiss | 198/850 X |
| 2,437,702 | 3/1948 | Miller et al. | 198/834 X |
| 3,174,617 | 3/1965 | Noffsinger | 198/834 X |
| 3,774,752 | 11/1973 | Harvey | 198/852 |
| 3,865,229 | 2/1975 | Velander | 198/850 X |
| 3,934,712 | 1/1976 | Jende | 198/850 X |
| 4,394,901 | 7/1983 | Roinestad | 198/850 |
| 4,981,210 | 1/1991 | Kornylak | 198/850 X |
| 5,125,504 | 6/1992 | Lorlett et al. | 198/850 |

FOREIGN PATENT DOCUMENTS

| | | | |
|---|---|---|---|
| 0694515 | 8/1940 | Fed. Rep. of Germany | 198/834 |
| 2745856 | 4/1979 | Fed. Rep. of Germany | 198/853 |
| 2829107 | 1/1980 | Fed. Rep. of Germany | 198/853 |
| 0691913 | 5/1953 | United Kingdom | 198/834 |

Primary Examiner—Robert P. Olszewski
Assistant Examiner—James R. Bidwell
Attorney, Agent, or Firm—Oldham, Oldham & Wilson Co.

[57] ABSTRACT

Improved engagement is achieved between a sprocket having a plurality of flat-topped teeth and an endless conveyor belt. The belt is formed from a plurality of generally flat load-bearing tabular rectangular modules disposed in transverse rows along the belt with the longer sides of each module positioned transverse to the direction of motion of the endless belt, the modules being hingedly connected to and extending between spaced rods, which pass through co-axial, equally-spaced eye portions projecting from the longer sides of the modules, the endless belt having a first load-bearing surface and an opposing sprocket-engaging surface. The improvement comprises placing at least two outwardly extending bosses on each module, one boss on each of at least one pair of adjacent eye portions on one longer side; a flange extending outwardly from the sprocket-engaging surface along each longer side of each module; an outwardly open arcuate valley between each tooth on each sprocket; and a transverse channel at the top of each of the two faces of each tooth of each sprocket, effectively providing each tooth with a pair of shoulder portions separated by a head portion.

4 Claims, 3 Drawing Sheets

ENDLESS CONVEYOR SYSTEM

This invention relates to an endless conveyor band and a drive sprocket therefor. More particularly, this invention relates to an endless conveyor band comprised of a plurality of flat load bearing modules disposed in transverse rows and a drive sprocket that is specially adapted to engage structures on the interior surface of the conveyor band so that direct drive of the band by the sprocket may be achieved. Even more particularly, the invention relates to an endless conveyor band and drive sprocket as described, wherein both components are formed from a moldable thermoplastic material.

BACKGROUND ART

The concept of teaching the production of an endless band conveyor comprising connected load bearing modules is generally taught in U.S. Pat. No. 3,774,752 to Harvey. Harvey discloses an endless conveyor band that is constructed of spaced load-bearing components that are hingedly connected to rod members that run transverse to the band. Harvey teaches several advantages to the construction of such conveyor modules from thermoplastic materials, including the ease of preparing a uniform module structure through the molding of the thermoplastic material. Harvey also teaches the advantages inherent in the use of a thermoplastic material over a metallic material, such as the immunity from problems such as corrosion, rusting and the like. Harvey also teaches the advantages of lighter weight, the reduction of drag on the driving gear and the like.

For all of the teachings of Harvey, however, he does not teach the combination of a direct drive mechanism with the modular endless conveyor belt. Further, Harvey does not teach the use of a thermoplastic drive system, so that some of the potential advantages of the Harvey system go unrealized.

SUMMARY OF THE INVENTION

It is, therefore, a first object of the present invention to provide a combination endless belt conveyor and drive system therefore, both components being formed from thermoplastic materials.

It is a further object of the invention to provide positive belt tracking by the deep tooth of the drive sprocket engaging the lower surface of the belt module between the tracking tabs provided. This positive engagement ensures that the endless conveyor band will travel in a straight line only.

It is a yet further object of the invention to provide an improved conveyor system wherein the endless band has an outer load bearing surface and an inner drive engaging surface and adaptations in the interior drive engaging surface and the drive sprocket result in an improved engagement between the conveyor and the drive means.

These and further objects of the invention are achieved by an endless conveyor system having improved engagement between at least one toothed sprocket and an endless belt. The belt is formed from a plurality of generally flat load-bearing tabular rectangular modules disposed in transverse rows along the band with the longer sides of each module positioned transverse to the direction of motion of the endless belt. The modules are hingedly connected to and extending between spaced rods, which pass through co-axial, equally-spaced eye portions projecting from the longer sides of the modules, the endless band having a first load-bearing surface and an opposing sprocket-engaging surface. The improvement to the endless conveyor system comprises at least two outwardly extending bosses on each module, one such boss on each of at least one pair of adjacent eye portions on one longer side; a flange extending outwardly from the sprocket-engaging surface along each longer side of each module; an outwardly open arcuate valley between each tooth on each sprocket; and a transverse channel at the top of each of the two faces of each tooth of each sprocket, effectively providing each said with a pair of shoulder portions separated by a head portion. The preferred endless conveyor system has the toothed sprocket and the endless belt both formed of a thermoplastic material, especially a thermoplastic material selected from the group consisting of polyethylene, polypropylene, poly(oxymethylene) and polyamide. Particular preference is given to ultrahigh molecular weight polyethylene and glass-reinforced nylon.

BRIEF DESCRIPTION OF THE DRAWINGS

For a more complete understanding of the invention, reference should now be made to the embodiments illustrated in greater detail in the accompanying drawings and described below by way of example only. In the drawings, identical parts are identified with identical part numbers, and they show as follows.

DETAILED DESCRIPTION OF DRAWINGS

The endless conveyor system of the present invention is formed by the interaction of an endless conveyor belt with at least one sprocket, the belt and the sprocket each being specially adapted to provide increased enmeshment of the belt with the sprocket to facilitate smooth and efficient drive of the belt by the sprocket. In the more general application in the prior art, the endless belt in the conveyor is a flexible uniform endless band of material, particularly a material such as leather or an elastomer, with a thickness that is small relative to the width thereof and especially small relative to the length thereof, so that the belt is held relatively tautly between a drive (or head) pulley and a take-up (or tail) pulley, the former of which is driven by a chain and sprocket system or a drive shaft, and the latter of which turns freely. In a more particularized application as illustrated in U.S. Pat. No. 3,774,752 to Harvey, the flexible belt comprises a finite number of rigid modules connected to the adjacent modules hingedly along the sides thereof that are transverse to the direction of travel of the endless belt which they comprise. Although an endless belt of this type lacks some of the inherent flexibility of the uniform endless band, the overall belt flexibility is not substantially altered if the number of modules used is large, that is, if the width of each individual module is small relative to the length of the belt.

The Harvey U.S. Pat. No. 3,774,752 teaches the construction of an endless band conveyor from individual load-bearing modules, particularly modules constructed of a molded plastic material, which is amenable to having further enhancements incorporated in the modules, such as grating-like load-bearing surfaces to facilitate drainage of wet articles. The plastics also have advantages over the metals in the ease of forming uniform modules, ease of cleaning, etc. The Harvey U.S. Pat. No. 3,774,752 patent does not, however, teach the method of effectively driving such an endless belt in a manner that minimizes belt slippage, shimmy, etc.

Figure 1:
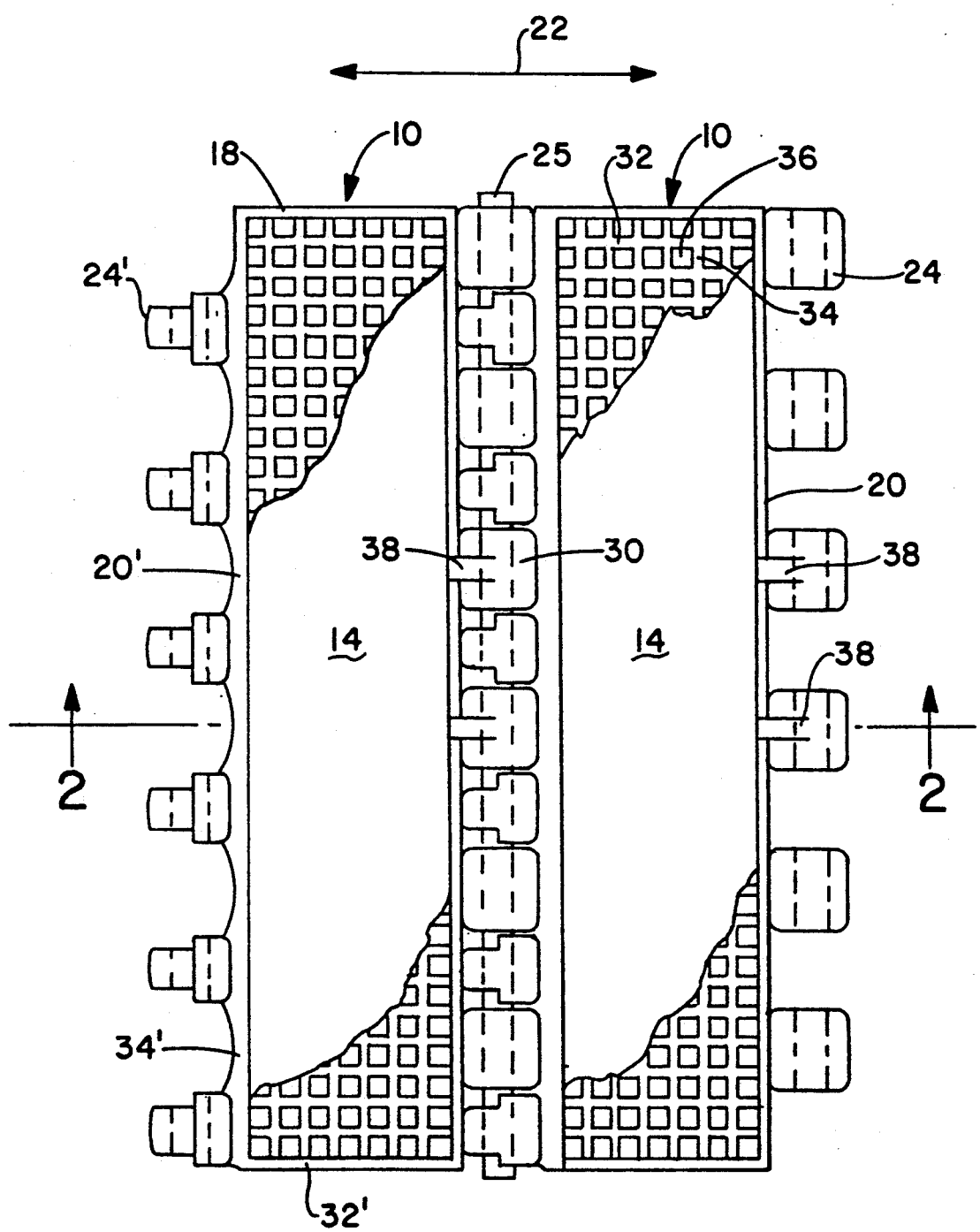
FIG. 1 is a bottom view of a pair of the modules of the endless conveyor belt of the present invention.
Figure 5:
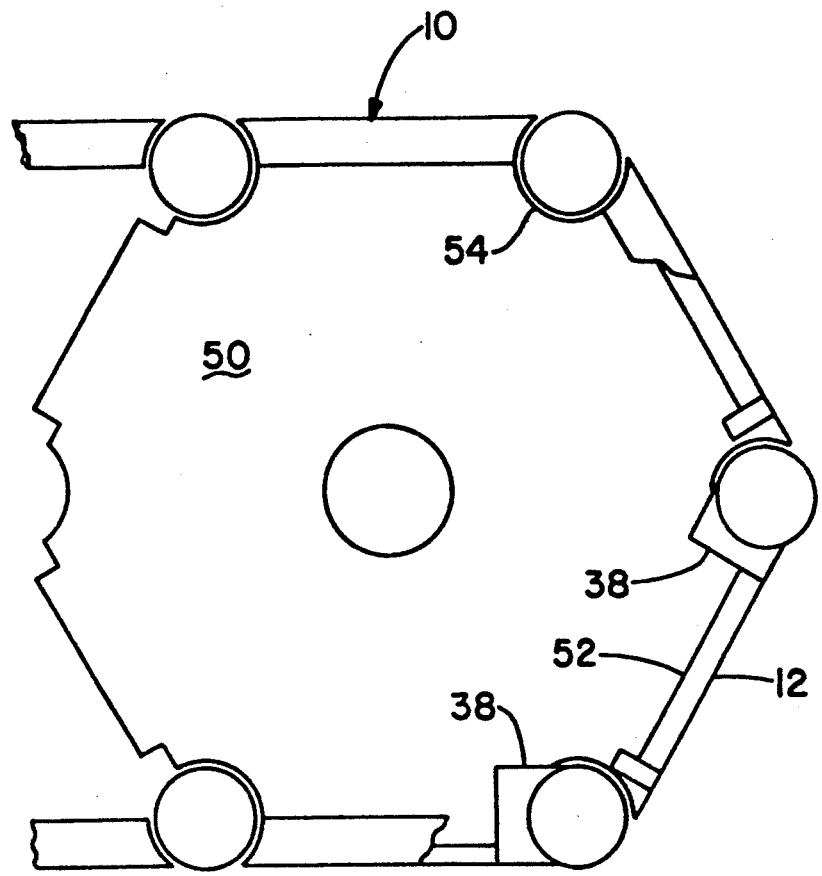
FIG. 5 is a side view showing the operative engagement of the endless conveyor belt and the sprocket.
Figure 2:
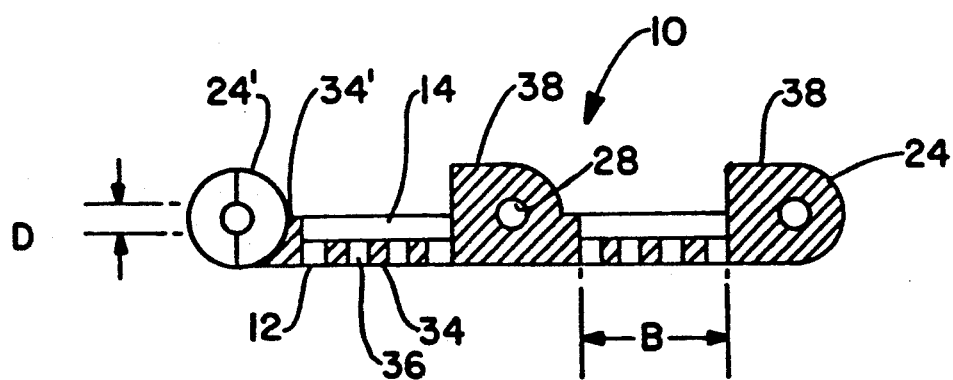
FIG. 2 is a side view of the pair of modules of FIG. 1, taken along Line 2—2 in FIG. 1.

FIG. 1 shows a bottom view of two individual modules 10 of the endless belt conveyor system of the present invention. Each load-bearing module 10 has a basically tabular form with a top surface 12 and a bottom surface 14, the bottom surface 14 being shown in the FIG. 1. Top surface 12 is not visible in FIG. 1 and reference is made now to FIG. 2, where the features thereof are more clearly shown. The module 10 comprises an oblong rectangular body part 16 with a pair of shorter sides 18 and a pair of longer sides 20 and 20'. In forming the belt, the individual modules 10 are positioned so that a longer side 20 is adjacent to a longer side 20' and both longer sides 20 and 20' lie transverse to the direction of travel 22 of the belt. The shorter sides 18 lie parallel to the direction 22 of belt travel. Projecting from and integral with each longer side 20 and 20' are a plurality of coaxial, equally spaced eye portions 24 and 24' (eye portions 24 being on longer side 20, eye portions 24' being on longer side 20'), through which a rod 25 may pass to hingedly connect the module 10 to the rod 25. The eye portions 24, 24' are generally cylindrical with imperforate circumferential walls 26 surrounding the eye 28 found in each eye portion 24, 24'. The eye portions 24 or 24' are spaced apart from each other just slightly further than the width of the individual eye portion 24 or 24'; the width being the dimension of the eye portion measured transverse to the conveyor band and axially to the eye 28. By staggering the eye portions 24 along longer side 20 with respect to the eye portions 24' along the opposite longer side 20', the adjacent modules 10 may be intercalated at the hinged connections along a single rod 25 to provide an essentially continuous sleeve 30 within which the rod 25 is contained across the width of the belt. This intercalation to form an essentially continuous sleeve 30 is shown at the central portion of FIG. 1. By repeating this hinging process of creating a continuous sleeve 30 at each longer side 20 and 20' of each module 10 and finally closing the belt by connecting the ends of the belt by intercalating a longer side 20 with a longer side 20' at the other end of the belt so that the respective bottom surfaces 14 are on the interior of the belt and upper surfaces 12 are on the exterior of the belt, the endless belt, a portion of which is shown in FIGS. 1, 2 and 5, is formed.

In the embodiment shown, the body part 16 of each individual module 10 is formed from a grid of equally-spaced parallel bars, a first set of such bars 32 parallel to the shorter sides 18 of the body part 12 and a second set of such bars 34 parallel to the longer sides 20 and 20', thereby forming a grid of bars with square openings 36 through which liquids and the like may pass. Although the bars are shown as being rectangular in cross section in FIG. 2, it would certainly be possible to taper the bars into a diamond cross section, for example, to further open the square openings at either the top surface 12 or bottom surface 14.

A further distinctive feature shown in FIG. 1 is the outermost bar 32' or 34' along each side of the body part 16, bars 32' forming shorter sides 18 and bars 34' forming longer sides 20 and 20'. These outermost bars are formed such that the thickness of each such outermost bar is about twice the thickness of the other bars 32 or 34. Since the bars 32 and 34 are aligned in a flush relationship to provide an essentially planar top surface 12 for the body part 16, the increased thickness of outermost bars 32' and 34' effectively provides a flange extending outwardly from the bottom surface 14 along each side 18, 20 and 20' of the body part 16. In addition to increased structural rigidity, the flange formed by the bars 32' and 34' provides other functional advantages, as described in more detail below.

A yet further feature shown in FIG. 1 is a pair of outwardly extending bosses 38, one of which is positioned on each of a pair of adjacent eye portions 24 on longer side 20 of each body part 12. Preferably, these adjacent eye portions 24 will be toward the middle of the longer side 20, but it is also possible to place such outwardly extending bosses 38 on more than one pair of adjacent eye portions 24, even to the extent of placing the outwardly extending bosses 38 on each eye portion 24 on longer side 20. Although the purpose and utility of these bosses 38 is explained in more detail below, it should be noted at this point that an outwardly extending boss 38 should not be placed on any of the eye portions 24' on the opposite longer side 20' of the body part 12, and, particularly, one should not be placed on the eye portion 24' that corresponds to the space between the eye portions 24 having the outwardly extending bosses 38, as this additional boss would impede the function of the first pair of bosses 38.

Further understanding of the modules 10 will be obtained by directing attention to FIG. 2, which discloses a side view of the modules 10 taken along Line 2—2 in FIG. 1. It is first observed that the eye portions 24, 24' have an external diameter that is about twice as large as the thickness of the downwardly extending flange formed by outermost bar 34', which is, in turn, about twice the thickness of the bars 34, which form the majority of body part 16. The eye portions 24 are positioned along outermost bar 34' so that the top of the eye portion 24 lies in a plane tangential to the top surface 12 of the body part 16 and the lower part of each eye portion 24 extends outwardly from the bottom surface of the body part. The particular section selected for FIG. 2 shows an outwardly extending boss 38 affixed to the lower part of the eye portion 24. The preferred embodiment illustrated in FIG. 2 shows this outwardly extending boss 38 to be an essentially triangular shape that extends downwardly as if it were an extension of the outermost bar 34' and extends laterally as if it were a tangential extension of the bottom of the eye portion 24. As probably better shown in FIG. 1, the width of the outwardly extending boss 38 is about the same as the width of a bar 34. The centerlines of the outwardly extending bosses 38 on adjacent eye portions 24 should be placed on midpoints of the widths of the eye portions 24, although the exact spacing is more of a function of the thickness of the sprocket with which the belt is to be used.

Figure 3:
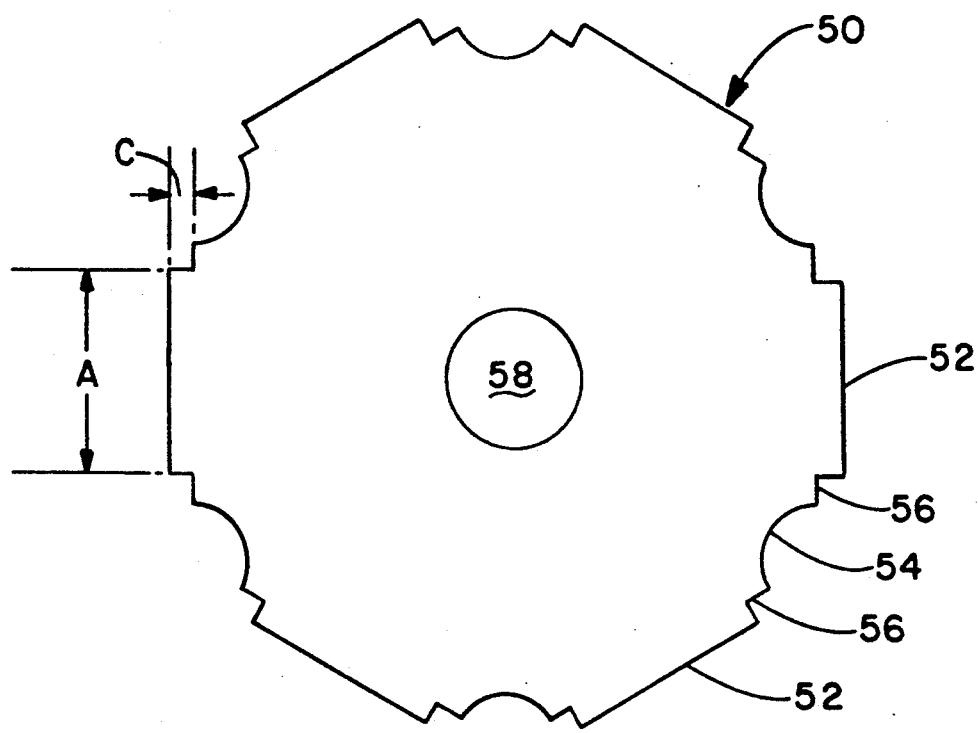
FIG. 3 is a side elevational view of the sprocket of the present invention.

Attention is now directed to FIG. 3, where the novel sprocket 50 for engaging and driving the endless band of modules 10 is disclosed. As shown in this side elevational view, the sprocket 50 is generally circular, with a repetitive series of cutouts made around the circumference thereof to define the teeth 52 and valleys 54 that engage the endless belt during operation. In the particular embodiment illustrated in FIG. 3, the sprocket 50 has six such teeth 52 and an equal number of valleys 54, the teeth 52 and valleys 54 alternating around the circumference of the sprocket 50. The variation of the number of teeth 52 and valleys 54 on the sprocket 50 is a design choice, however. It would be possible to go as low as three such teeth 52. The upper limit is theoretically infinite, but the practical upper limit is in the range of ten to twelve teeth 52.

Moving around the circumference of the sprocket 50, one encounters a repetitive sequence consisting of a shallow, flat-topped tooth 52, a "V" shape notch 56 at the side of the tooth, a concave valley 54, and a second "V" shape notch 56. In this fashion, a "V" shape notch 56 is positioned on each side of each tooth 52 so that the notch 56 essentially forms a "shoulder" portion on each side of the "head" of the tooth 52. These structures are dimensioned to interact with the modules 10 of the endless conveyor band. Specifically, the length A of each tooth 52 is slightly smaller than the distance B between the innermost edges of the outermost bars 34' and the height C shown on FIG. 3 is approximately the same as the depth D of the flanged longer sides 20, 20', dimensions A and C being shown in FIG. 3 and dimensions B and D being shown in FIG. 2. In other words, when a module 10 rests upon a sprocket 50 as shown in FIG. 5, the top of the tooth 52 rests comfortably against the lower surface 14 and the respective shoulders formed by notches 56 rest against the longer sides 20, 20'. The radius of curvature of the concave valley 54 is substantially the same as the radius of curvature of the eye portions 24, 24' so that each valley 54 comfortably engages a corresponding eye portion 24, 24' of the module 10.

The central aperture 58 of the sprocket 50 is intended for non-slip engagement on a drive shaft passing therethrough. Although not specifically illustrated, it would be common practice to utilize a keyhole in the aperture 58 as well as in the drive shaft and a sacrificial key disposed therein to prevent damage to either the sprocket 50 or the drive shaft when the belt is subjected to a high torque force. This feature may be relatively important in this particular conveyor system, since the preferred polymeric composition of the sprocket 50 would be more susceptible to damage than the drive shaft. A proper sacrificial key could be selected from the class of polymers that would fail more quickly under such a torque than the polymer selected for the sprocket. The person of ordinary skill in this art will quickly recognize that there are a variety of ways of achieving non-slip enagagement of the sprocket on the drive shaft, including, but not limited to, the use of a square bore on a shaft with a square cross section.

As seen in FIG. 3, the sprocket 50 is not fitted with deep teeth 52, so that the overall impression of the sprocket 50, when viewed from the side, is essentially that of a circular piece.

Figure 4:
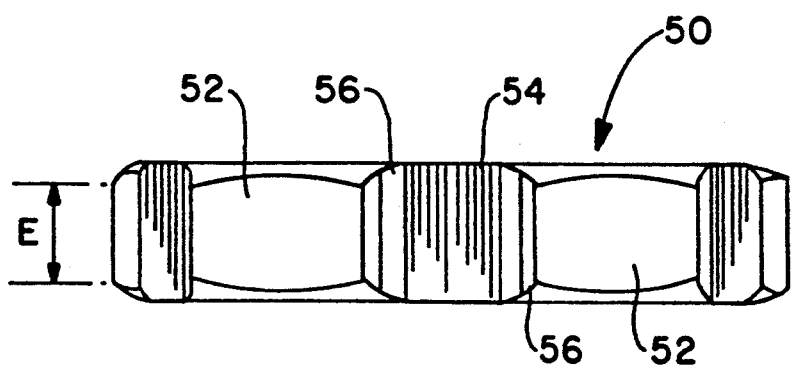
FIG. 4 is a front elevational view of the sprocket of the present invention.

The front view of the sprocket 50, that is, the view made along the direction of motion of the conveyor belt, is shown in FIG. 4. In this view, the axis of rotation of the sprocket 50 lies in the plane of the illustration. An aspect of the invention disclosed in FIG. 4 is the chamfering of the tops of the teeth 52, intended to assist in the comfortable engagement of the tops of the teeth 52 into the confines defined by the flanges along the long sides 20, 20' of each module 10 and the outwardly extending bosses 38 on eye portions 24. The width of the teeth E, as shown in FIG. 4, should be just slightly larger than the separation of the inner edges of the pair of bosses 38, so that the tooth 52 is comfortably engaged on all sides by the flanges and the bosses on the bottom surface 14 of the module 10. In this manner, the tooth 52 is not able to significantly shift in either the direction of travel of the belt or the transverse direction thereto.

The actual engagement of the conveyor belt with the sprocket 50 is shown in side elevational view in FIG. 5. As shown in this FIGURE, the engagement occurs over about 240 degrees of the 360 degree circumference of the sprocket as the belt makes a 180 degree change in direction. Because the modules 10 form a endless belt comprising oblong planar portions transverse to the direction of travel separated by essentially continuous transverse sleeves containing rods for joining the planar portions and allowing angular flexion of the belt, the belt of the present invention can be driven by a sprocket of the present invention in either the clockwise or counterclockwise direction with equal facility. FIG. 5 also shows how the outwardly extending bosses 38 of the modules provide a stability to the system against "wobble" or relative sidewise movement of the sprocket to the belt. By combining the interaction of the sprocket teeth 52 with both the outwardly extending bosses 38 and the flanges on the long sides 20, 20', the teeth are effectively meshed onto the interior surface of the endless belt.

As mentioned above, the preferred materials of construction of the belt and sprocket are polymeric materials that will be able to be subjected to high enough temperatures to effectively clean them for use with food products, are stable over extended periods of use, and that have an inherent quality of being essentially self-lubricating when they are used in engagement. The polyethylenes and polypropylenes are examples of such polymers that will be useful for this purpose. Particularly preferred among the polyethylenes are the ultra-high molecular weight ("UHMW") polyethylenes. By UHMW polyethylene, we generally mean polyethylenes having a molecular weight in the range of 3 to 6 million, as opposed to a range of at least 500,000 for conventional high-density polyethylene. Another polymer that is qualified for this application is acetal, which is a generic name for poly(oxymethylene), and which is sold commercially by a variety of companies under various tradenames. Acetals are available as homopolymers and as copolymers, one example of the homopolymer being duPont's DELRIN; an example of the copolymer would be Celanese's CELCON. Another acceptable polymer would be one of the commercially available glass-reinforced polyamides.

While in accordance with the patent statutes, the best mode and preferred embodiment of the invention have been described, it is to be understood that the invention is not limited thereto, but rather is to be measured by the scope and spirit of the appended claims.

What is claimed is:

1. An endless conveyor system having improved engagement between at least one sprocket having a plurality of flat-topped teeth and an endless belt which is formed from a plurality of generally flat load-bearing tabular rectangular modules disposed in transverse rows along the belt with the longer sides of each said module positioned transverse to the direction of motion of the endless belt, said modules being hingedly connected to and extending between spaced rods, which pass through co-axial, equally-spaced eye portions projecting from the longer sides of said modules, the endless belt having a first load-bearing surface and an opposing sprocket-engaging surface, wherein the improvement comprises:

a.) at least two outwardly extending bosses on each said module, one said boss on each of at least one pair of adjacent said eye portions on one said longer side;
   b.) a flange extending outwardly from the sprocket-engaging surface along each said longer side of each said module;
   c.) an outwardly open arcuate valley between each tooth on each said sprocket; and
   d.) a transverse channel at the top of each of the two faces of each tooth of each said sprocket, effectively providing each said tooth with a pair of shoulder portions separated by a head portion; and
   wherein the flanges and bosses on said sprocket-engaging surface of the endless belt essentially form a rectangular pocket within which the head and shoulders portions of the flat-topped tooth of the sprocket are effectively engaged to prevent wobble of the sprocket in driving the endless belt.

2. The endless conveyor system of claim 1 wherein said toothed sprocket and said endless belt are both formed of a thermoplastic material.

3. The endless conveyor system of claim 2 wherein the thermoplastic material is selected from the group consisting of polyethylene, polypropylene, poly(oxymethylene) and polyamide.

4. The endless conveyor system of claim 1 wherein the flanges and bosses on said sprocket-engaging surface of the endless belt are used to prevent any lateral motion of the endless belt as it is driven by the sprocket.

* * * * *